US008146991B2

(12) United States Patent
Stanz et al.

(10) Patent No.: US 8,146,991 B2
(45) Date of Patent: Apr. 3, 2012

(54) TRANSMISSION DEVICE FOR SEAT ADJUSTER

(75) Inventors: Kannan S. Stanz, Canton, MI (US); Eugen F. Craciun, Ann Arbor, MI (US); Ganesh T. Ramaseshadri, Ypsilanti, MI (US); William S. Brewer, Plymouth, MI (US)

(73) Assignee: Johnson Controls Technology Company, Holland, MI (US)

( * ) Notice: Subject to any disclaimer, the term of this patent is extended or adjusted under 35 U.S.C. 154(b) by 264 days.

(21) Appl. No.: 12/302,727

(22) PCT Filed: Mar. 26, 2007

(86) PCT No.: PCT/US2007/007465
§ 371 (c)(1),
(2), (4) Date: Nov. 26, 2008

(87) PCT Pub. No.: WO2007/126757
PCT Pub. Date: Nov. 8, 2007

(65) Prior Publication Data
US 2010/0013285 A1    Jan. 21, 2010

Related U.S. Application Data

(60) Provisional application No. 60/786,133, filed on Mar. 27, 2006.

(51) Int. Cl.
*A47C 1/00* (2006.01)
*F16H 27/02* (2006.01)
(52) U.S. Cl. ............ 297/344.17; 297/344.13; 74/89.36; 74/89.34; 74/411

(58) Field of Classification Search ............. 297/344.13, 297/344.17; 74/89.36, 89.34, 400, 412 R, 74/89.23, 411
See application file for complete search history.

(56) References Cited

U.S. PATENT DOCUMENTS

| 904,931 | A | * | 11/1908 | Bowes | .................. 74/412 R |
|---|---|---|---|---|---|
| 2,929,439 | A | * | 3/1960 | Tanaka et al. | ................. 248/393 |
| 3,022,975 | A | * | 2/1962 | Horton et al. | ................. 248/420 |
| 3,416,386 | A | * | 12/1968 | Pickles | .................... 74/89.37 |
| 5,394,288 | A | * | 2/1995 | Nishida et al. | .................. 361/31 |
| 5,831,360 | A | * | 11/1998 | Senjo et al. | ..................... 310/80 |
| 6,250,170 | B1 | * | 6/2001 | Hill et al. | ..................... 74/89.23 |
| 6,273,507 | B1 | * | 8/2001 | Downey | .................. 297/344.15 |
| 6,347,778 | B1 | * | 2/2002 | Koga et al. | ..................... 248/421 |
| 6,490,942 | B1 | * | 12/2002 | Meyer | .......................... 74/89.37 |
| 6,517,157 | B1 | * | 2/2003 | Vorac | ...................... 297/344.13 |

(Continued)

FOREIGN PATENT DOCUMENTS

JP    60076433 A * 4/1985

(Continued)

*Primary Examiner* — David Dunn
*Assistant Examiner* — David E Allred
(74) *Attorney, Agent, or Firm* — Butzel Long

(57) ABSTRACT

A transmission device for a vehicle component adjuster, such as a seat adjuster, may include a drive screw, a drive member and a load transfer member. The drive member engages the drive screw and has a first end with an outer periphery and an end surface. The load transfer member has a first portion disposed at least partially around the periphery of the drive member and a second portion configured to be positioned between the end surface and a support structure supporting the seat adjuster relative to a track arrangement or system. The load transfer member is configured to transfer an axial load applied to the drive member to the support structure.

10 Claims, 7 Drawing Sheets

U.S. PATENT DOCUMENTS

| | | | |
|---|---|---|---|
| 6,843,460 B2 * | 1/2005 | Koga et al. | 248/421 |
| 7,275,791 B2 * | 10/2007 | Sakamaki | 297/362.14 |
| 7,883,054 B2 * | 2/2011 | Elliott et al. | 244/99.9 |
| 7,886,625 B2 * | 2/2011 | Cheng | 74/89.37 |
| 7,891,265 B2 * | 2/2011 | Erikson et al. | 74/441 |
| 2004/0093969 A1 * | 5/2004 | Nielsen | 74/89.23 |
| 2008/0006105 A1 * | 1/2008 | Ko | 74/89.23 |
| 2008/0011114 A1 * | 1/2008 | Oberle et al. | 74/89.23 |
| 2008/0196524 A1 * | 8/2008 | Oberle et al. | 74/89.34 |
| 2008/0295624 A1 * | 12/2008 | Oberle et al. | 74/89.34 |
| 2009/0236891 A1 * | 9/2009 | Ito | 297/354.12 |
| 2011/0132115 A1 * | 6/2011 | Lee | 74/89.37 |
| 2011/0168116 A1 * | 7/2011 | Billot | 123/179.1 |

FOREIGN PATENT DOCUMENTS

| | | | |
|---|---|---|---|
| WO | WO 2004020870 A1 * | 3/2004 | |

* cited by examiner

FLAT WASHER

TRANSMISSION DEVICE FOR SEAT ADJUSTER

BACKGROUND

The present disclosure relates generally to the field of adjustable seat assemblies. More particularly, the present disclosure relates to the field of seat adjuster systems for use with adjustable vehicle assemblies including a seat.

Vehicle seat assemblies commonly include a seat (having a seat bottom and a seat back) and a seat adjuster system that enables the position of the seat within the vehicle to be adjusted. Seat adjuster systems are used with seats of the vehicle to provide selective horizontal fore and aft movement of the seat, vertical movement of the seat, and/or pivotal movement of the seat back. The ability to adjust the position of the seat is desirable to enable vehicle seat occupants of various sizes to be seated comfortably and safely within the motor vehicle.

Seat adjuster systems commonly include a support frame which supports the seat bottom on a track system. To provide for horizontal movement, typically in a fore and aft vehicle direction, the track system commonly includes at least two track assemblies or arrangements that are located on each side of the seat. Each track arrangement generally includes two or more tracks that move relative to one another and a device or assembly that controls the ability of the tracks to move relative to one another. Some seat adjuster systems utilize a powered drive mechanism (typically an electric motor) in conjunction with a system of gears and other components to control the relative positions of the individual tracks of each track arrangement. For example, it is known to use a threaded drive screw in combination with one or more gears positioned between an output of the powered drive mechanism and the drive screw. To move a seat coupled to such a track system to a new position, the occupant simply activates the powered drive mechanism, which through a series of additional components (e.g., a drive screw, gear configuration, etc.), causes the individual tracks to move relative to one another.

Similar track systems and drive mechanisms are generally provided for vertical (up and down) adjustment of the seat support frame and, in a seat adjuster system having a seat recliner adjustment mechanism, for angularly adjusting the position of the seat back with respect to the seat bottom. The vertical drive mechanism may also include separate front, rear, and/or side edge seat adjustment drive mechanisms for selectively tilting the front, rear, and/or side edges of the seat bottom independent of each other as well as to raise and lower the entire vehicle seat or, in some applications, only the seat bottom or cushion.

Seat assemblies (and thus seat adjuster systems) are known to be susceptible to loads of greater magnitude than loads experienced during normal use (i.e., those loads typically realized when seat occupants are seated in the seat assemblies). For example, loads of greater magnitude may be realized by the seat assemblies when a vehicle experiences a frontal or rear impact (e.g., collision, etc.). Such loads may cause one or more components of the seat adjuster system to fail.

For example, when a vehicle experiences a rear impact, an increased load is transferred from a seat occupant to the seat back. Referring to FIG. 7, a common load path has the load transferring from the seat back to the track system, from the track system to a threaded lead screw of a vertical lift system, from the lead screw to a gear and/or drive nut (commonly formed of plastic) engaging the lead screw, and subsequently from the drive nut to a housing and/or bracket (at least one of which is commonly formed of metal) used to mount to the vertical lift system to a support structure (e.g., the track system, etc.). A flat thrust washer is provided between the drive nut and the housing. The positioning of a gear and/or drive nut formed of plastic in the load path along with adjacent components commonly formed of metal, may cause the gear and/or drive nut to fail (e.g., crack, peel, lose position on the drive screw, etc.) if the vehicle experiences a sufficient impact.

Accordingly, it would be advantageous to provide a seat adjuster system that cushions or otherwise protects a gear and/or drive nut within the seat adjuster system from an axial load. It would be also advantageous to provide a seat adjuster system that is capable of transferring an axial load realized by a gear and/or drive nut engaging a threaded drive screw to an adjacent support structure in a way that reduces the likelihood that the gear and/or drive nut might fail. It would also be advantageous to provide a seat adjuster system that reduces the likelihood that a plastic gear and/or drive nut within the seat adjuster system will fail during an impact. It would also be advantageous to provide a seat adjuster system having a vertical lift drive system utilizing a plastic gear and/or drive nut that is better protected from an axial force. To provide a seat adjuster system having one or more of these, or any other advantages realized from the present disclosure, would be a significant advancement.

SUMMARY

One exemplary embodiment relates to a transmission device for a vehicle component adjuster, such as a seat, and configured to be supported by a support structure. The transmission device includes a drive screw, a drive member and a load transfer member. The drive member engages the drive screw and has a first end with an outer periphery and an end surface. The load transfer member has a first portion disposed at least partially around the periphery of the drive member and a second portion configured to be positioned between the end surface and the support structure. The load transfer member is configured to transfer an axial load applied to the drive member to the support structure.

Another exemplary embodiment relates to a vehicle seat assembly. The vehicle seat assembly includes a seat having a back portion and seat base, a track arrangement supporting the seat, a support structure coupled to the track arrangement and an adjuster supported by the support structure. The adjuster is configured to move the seat relative to the track arrangement and has a powered drive mechanism and a transmission device. The transmission device may include a drive screw, a drive member and a load transfer member. The drive member engages the drive screw and has a first end with an outer periphery and an end surface. The end surface is positioned adjacent to the support structure. The load transfer member has a first portion disposed at least partially around the periphery of the drive member and a second portion separating the end surface from the support structure.

Another exemplary embodiment relates to a vehicle seat having a seat base and a back portion arranged with respect to a track arrangement having a drive screw and an adjuster supported by the support structure and configured to move the seat relative to the track arrangement. The track arrangement supports the seat base and the back portion. The adjuster has a transmission device including a drive member engaging the drive screw. The drive member has a first end with an outer periphery and an end surface. The end surface is positioned adjacent to the support structure. The transmission device further includes a load transfer member having a first portion disposed at least partially around the drive member and a second portion separating the end surface of the drive member from the support structure.

Another exemplary embodiment relates to a method of transferring an axial load within a seat adjuster coupled to a track arrangement by a support structure. The method includes the steps of providing a drive member having an outwardly extending gear portion and an end with an outer periphery and an end surface, positioning the end surface of the drive member proximate the support structure, engaging the drive member with a drive screw configured to move relative to the drive member, providing a load transfer member having a sidewall extending between a first end and a second end, the first end having an inwardly extending an end wall, the second end having an outwardly extending flange, and positioning the load transfer member at the drive member with the sidewall at least partially surrounding the outer periphery, the end wall separating the end surface from the support structure and the flange adjacent to the gear portion.

Another exemplary embodiment relates to a transmission or motion transfer apparatus configured to be coupled to a support structure. The motion transfer apparatus may include a threaded lead screw and a drive nut engaging the threaded lead screw. The drive nut may include a shaft portion or hub extending axially outward the motion transfer apparatus further includes a load transfer member configured to transfer an axial load applied to the drive nut to the support structure. The load transfer member is an annular member supported by the hub of the drive nut. The load transfer member has a first portion configured to engage the drive nut and a second portion configured to engage the support structure.

In such an embodiment, the motion transfer apparatus may be part of a drive system used to control the elevation of a seat or otherwise adjust elements within a vehicle (e.g., a vertical lift drive system, etc.). The drive nut may further include gear teeth extending radially outward from the hub. The gear teeth are configured to transfer the rotational movement of an output shaft (e.g., an output shaft of an electric motor, etc.) to the lead screw. According to one embodiment, the lead screw moves relative to the drive nut, but alternatively, the drive nut may move relative to the drive screw. In either case, the translational movement of the drive nut or lead screw causes an adjustment to the seat. In one exemplary embodiment, the load transfer member is a cup washer having a generally cylindrical body with an end wall provided at a first end of the body and an outwardly extending flange provided at a second end of the body. The flange of the cup washer is configured to engage the drive nut, while the end wall is configured to engage the support structure. According to one embodiment, the support member is a bracket formed of metal, while the drive nut is formed of plastic.

Another exemplary embodiment relates to a seat adjuster system including a drive system for adjusting the positioning of a vehicle seat. The drive system is supported on a track system and may include an electric motor and a transmission or motion transfer apparatus. The electric motor includes a output shaft configured to engage and operate the motion transfer apparatus. The motion transfer apparatus includes a helical gear engaging a threaded lead screw and a housing at least partially enclosing the lead screw and the helical gear. The helical gear may include a gear portion and a shaft portion. The shaft portion extends axially relative to each side of the gear portion. The motion transfer apparatus further includes a load transfer member configured to at least partially transfer a load applied to the helical gear to a bracket used to secure the drive system to the track system. The load transfer member is an annular member supported by the shaft portion of the helical gear. The load transfer member has a first portion configured to engage the gear portion of the helical gear and a second portion configured to engage the bracket.

Another exemplary embodiment relates to a method of reducing a load transferred to a drive nut within a seat adjuster system in the event of an impact. The method comprises the steps of providing a threaded lead screw, engaging the drive nut with the lead screw, providing the drive nut within a housing, securing the housing to a support structure, and providing a load transfer member between the drive nut and the support structure. The load transfer member is configured to transfer an axial load applied to the drive nut to the support structure. In one embodiment, the load transfer member is a cup washer.

DETAILED DESCRIPTION

Before providing the description of the exemplary and alternative embodiments of the seat adjuster system, it should be noted that references to "outer," "inner," "intermediate," "above," "below," "upper," "lower," "left," "right", or "axial" in this description are merely used to identify the various elements as they are oriented in the FIGURES or as they may be oriented in one or more particular embodiments of the seat adjuster system. These terms are not meant to limit the element which they describe, as the various elements may be oriented or arranged differently in various seat adjuster systems.

It should also be noted that the seat adjuster systems and methods disclosed herein can be used in a variety of vehicle seat systems (e.g., front seats including both a driver's seat or a passenger's seat, second or third row seats, bucket seats, bench seats, etc.) for automobiles such as cars, trucks, sport utility vehicles, minivans, buses, and the like; airplanes, boats, etc. and other non-vehicle seat applications wherein it would be desirable to reduce a load being imparted on a gear, drive nut, and/or any other component used within the seat adjuster system (e.g., office furniture, adjustable medical tables and/or chairs, dental chairs, etc.). It should further being noted that while the transmission device will be described in detail herein with reference to a vertical lift system of a seat adjuster system, the transmission device may be equally applicable for use with any other portion of a seat adjuster system (e.g., horizontal drive systems, angular displacement systems, etc.).

Figure 8:
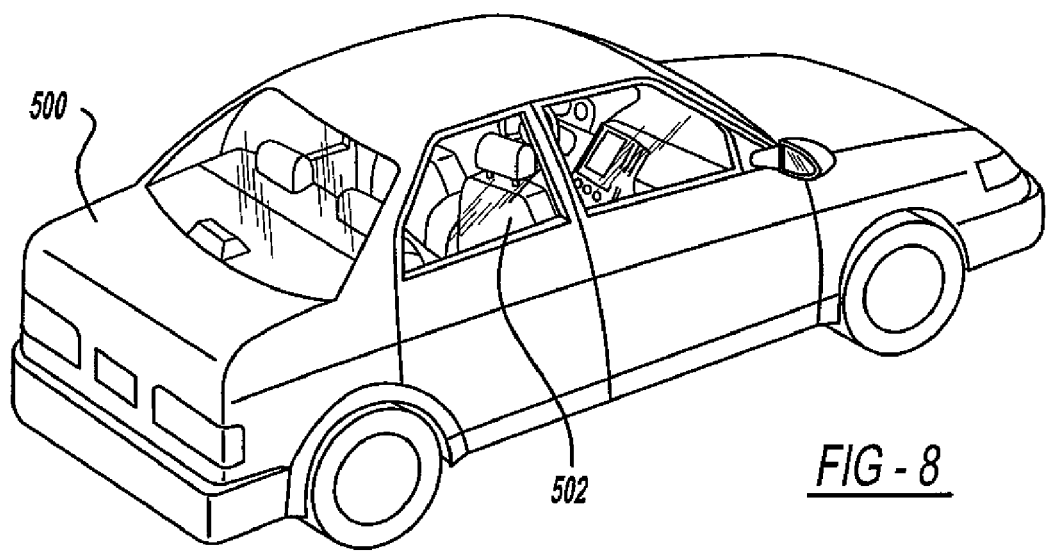
FIG. 8 is a perspective view of a vehicle shown according to an exemplary embodiment.
Figure 9:
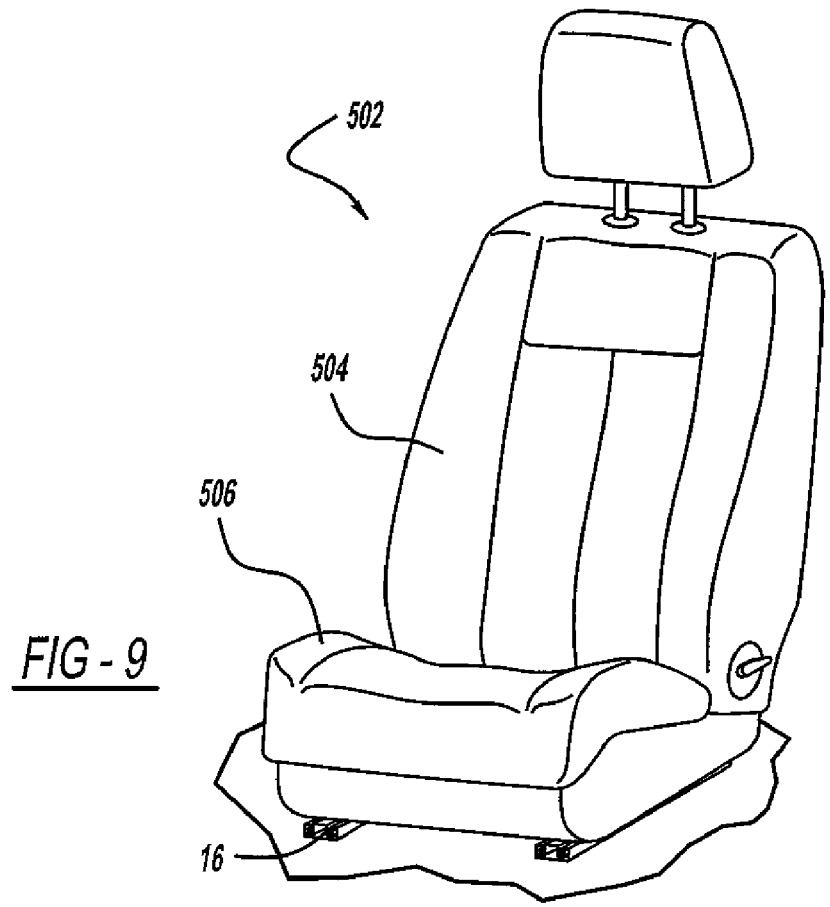
FIG. 9 is a perspective view of a vehicle seat shown according to an exemplary embodiment.

Referring generally to FIGS. 1 through 6, there is shown a seat adjuster system 10 and components thereof according to one non-exclusive exemplary embodiment. Seat adjuster system 10 enables the positioning of a seat to be selectively adjusted within a vehicle (e.g., a vehicle 500 as shown in FIG. 8). Seat adjuster system 10 includes an upper support frame structure 14, a horizontal drive system 90, one or more vertical lift drive systems 100 (shown as including a first or front vertical lift drive system and a second or rear vertical lift drive system), and a recliner drive system (not shown). Horizontal drive system 90 provides fore and aft movement for the seat to allow for horizontal adjustment, while vertical lift drive system 100 provides substantially vertical movement of a seat bottom 506, shown in FIG. 9, (e.g., the entire seat bottom, a front, rear, and/or side edge of the seat bottom, etc) to allow for vertical and/or tilt adjustment. The recliner drive system provides rotatable movement of a seat back 504 (also shown in FIG. 9), permitting adjustment in the angle of inclination of the seat back.

Figure 1:
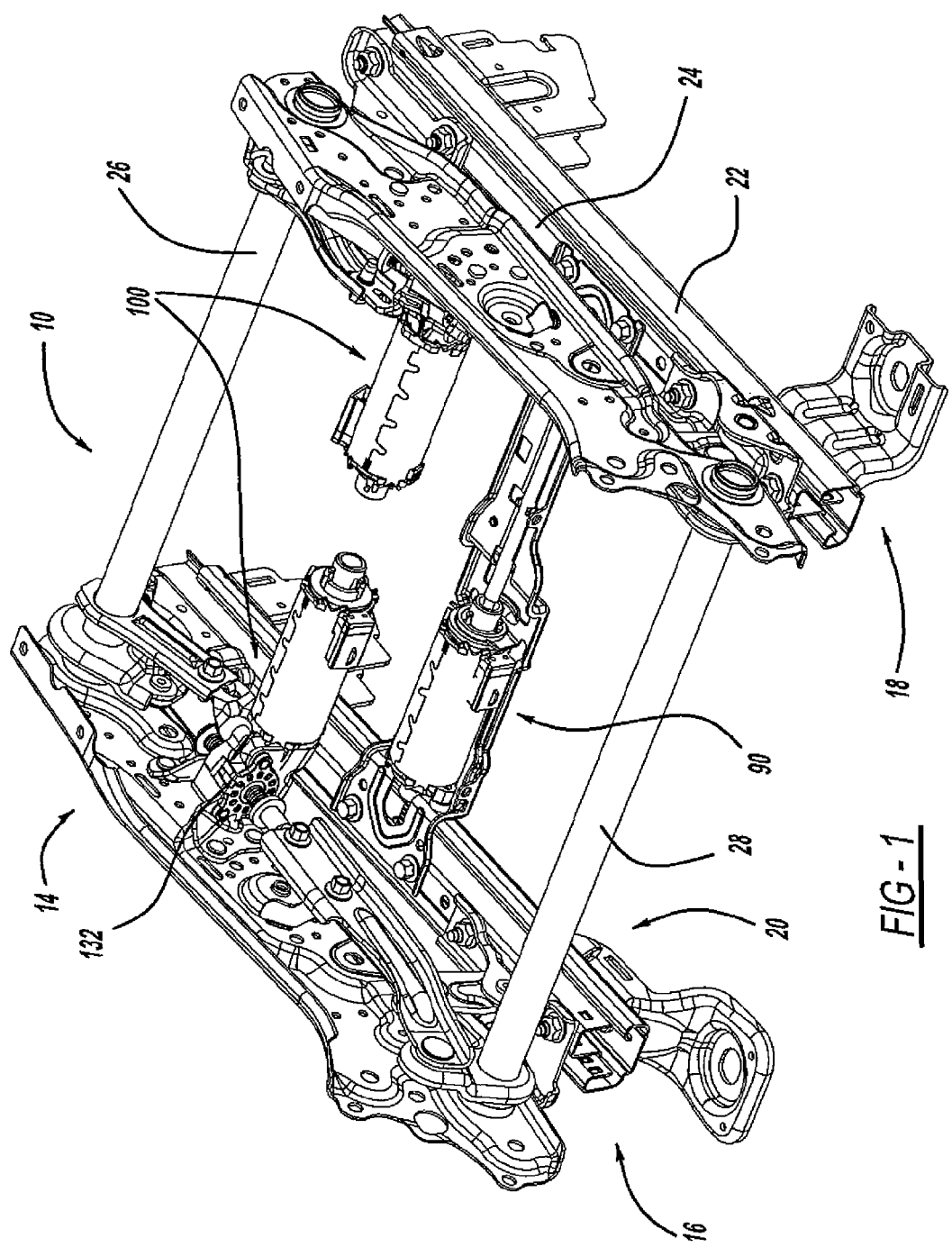
FIG. 1 is a perspective view of a seat adjuster system shown according to an exemplary embodiment.

Referring now to FIG. 1 in particular, seat adjuster system 10 is further shown as including a track system 16. Track system 16 supports upper support frame structure 14. Track system 16 includes a first track arrangement, shown as an inboard track arrangement 18, and a second track arrangement, shown as an outboard track arrangement 20. Inboard track arrangement 18 and outboard track arrangement 20 are coupled to a seat bottom or cushion portion of the seat in a generally spaced-apart and parallel relationship, with inboard track arrangement 18 being located proximate the inboard side of the seat bottom and outboard track arrangement 20 being located proximate the outboard side of the seat bottom. Track arrangement 20 is generally identical to track arrangement 18, except that track arrangement 20 is a mirror image of track arrangement 18. Each track arrangement generally includes a first track member, shown as a lower track 22, and a second track member, shown as an upper track 24.

Lower track 22 (e.g., track, rail, slide, guide, etc.) is an elongated and generally rigid member that is configured to be coupled to a foot or riser structure, or alternatively directly to the floorboard of a vehicle, and to generally serve as a guide for upper track 24. Upper track 24 (e.g., track, rail, slide, guide, etc.) is an elongated and generally rigid member that is configured to be coupled to lower track 22 in a manner that allows upper track 24 to move (e.g., translate or slide, etc.) relative to lower track 22. Movement of upper track 24 relative to lower track 22 adjusts the horizontal positioning of the seat. Such movement is controlled by horizontal drive system 90. According to one exemplary embodiment, lower track 22 and upper track 24 have a configuration similar to the configuration disclosed in International Patent Application Number PCT/US2005/040779, titled "Vehicle Seat Track," and filed Nov. 10, 2005, the complete disclosure of which is hereby incorporated by reference.

Extending laterally between and substantially perpendicular to inboard track arrangement 18 and outboard track arrangement 20 is a front member (e.g., cylindrical member, tube, rod, etc.), shown as a front torsion tube 26, and a rear member (e.g., cylindrical member, tube, rod, etc.), shown as a rear torsion tube 28. Suitable linkage may be provided between front and rear torsion tubes 26, 28 and the track arrangements to rotatably couple front and rear torsion tubes 26, 28 relative to the track arrangements. The rotatable movement of front and rear torsion tubes 26, 28 adjusts the vertical positioning of a front edge and a rear edge of the seat bottom respectively. Such movement is controlled by the vertical lift drive system 100.

According to various alternative embodiments, track system 16 may have any of a number of suitable configurations, and is not limited to the track system described herein. For example, track system 16 may include one or more track arrangements in addition to inboard track arrangement 18 and outboard track arrangement 20. Further, each track arrangement may consist of only a single track, or alternatively may comprise more than two tracks. Further still, the tracks may have different profiles then those disclosed in International Patent Application Number PCT/US2005/040779. Further still, torsion bars 26, 28 may be replaced with any structure suitable for controlling the elevation of the seat bottom.

Figure 2:
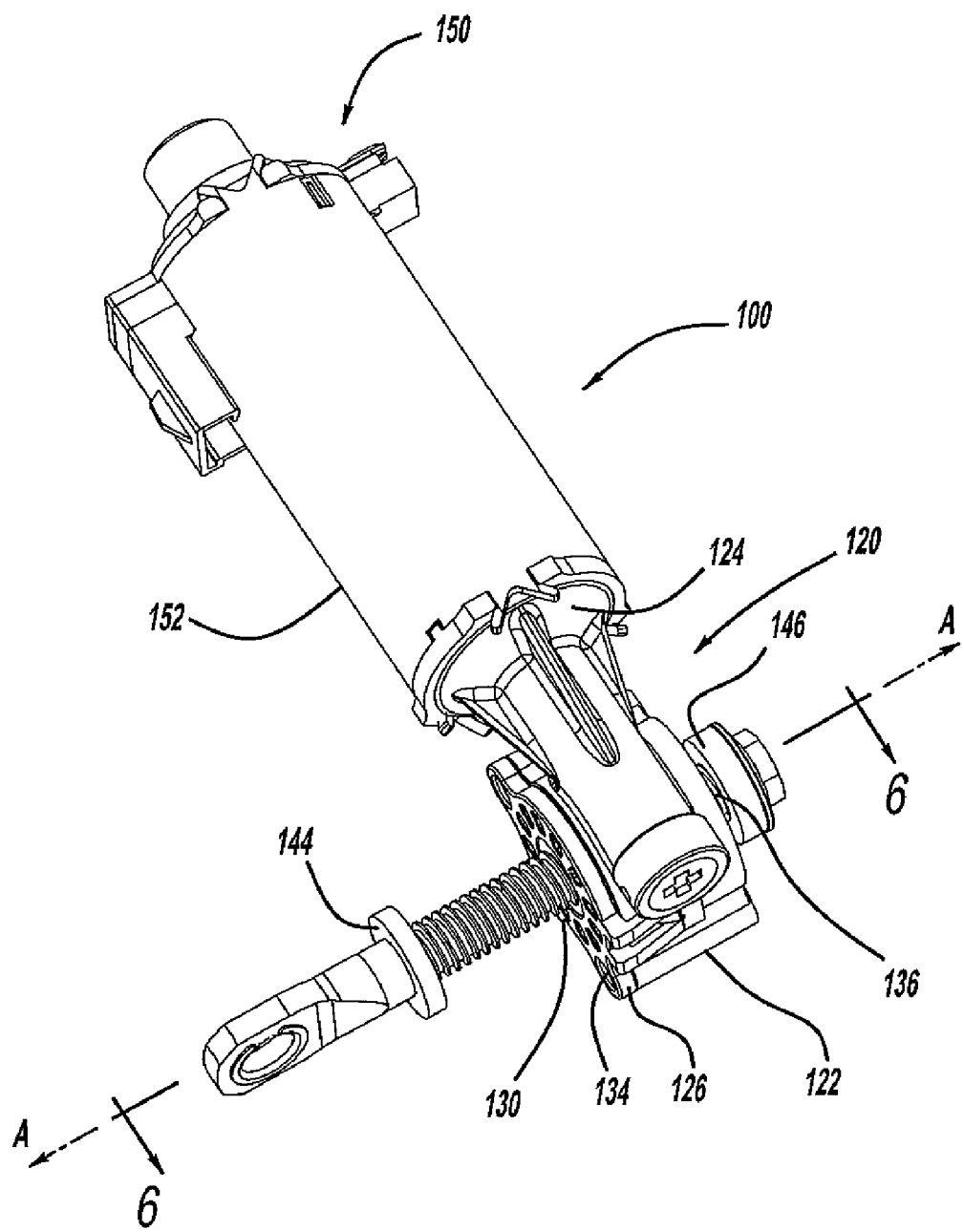
FIG. 2 is perspective view of a vertical lift system of the seat adjuster system shown in FIG. 1.

Referring to now FIG. 2 in particular, vertical lift drive system 100 is shown according to an exemplary embodiment. Vertical lift drive system 100 generally comprises a power source 150 and a transmission or motion transfer apparatus 120. The combination of power source 150 and motion transfer apparatus 120 enables a seat occupant to selectively adjust the elevation of the seat bottom (or at least a portion thereof) within the vehicle. A first vertical lift drive system 100 is shown in FIG. 1 as being coupled between upper support frame structure 14 and a front portion of track system 16 to adjust the positioning of front torsion tube 26 (and thus a front edge of the vehicle seat), while a second vertical lift drive system 100 is shown as being similarly coupled at an opposite side of track system 16 to adjust the positioning of rear torsion tube 28.

Figure 3:
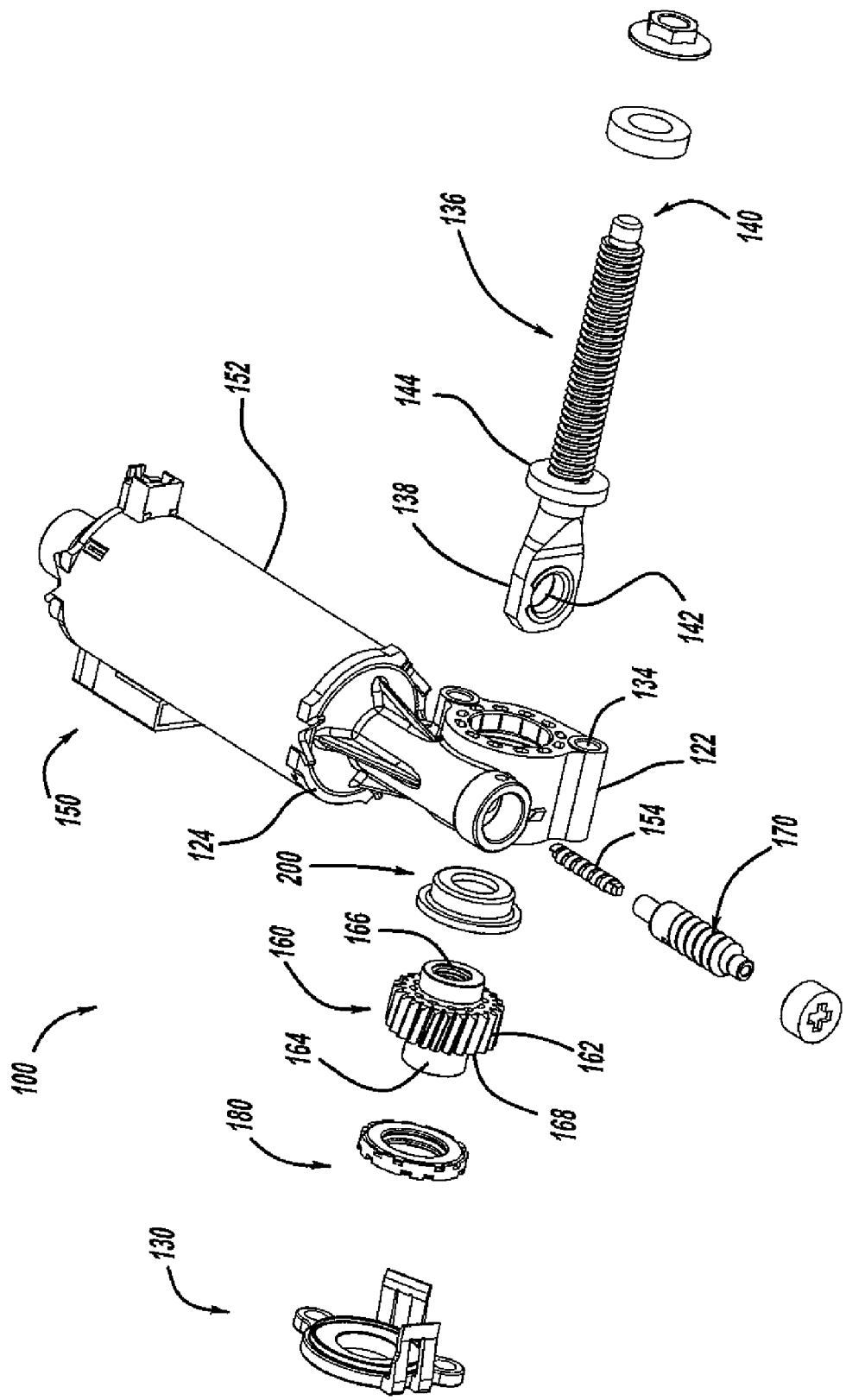
FIG. 3 is an exploded perspective view of the vertical lift system shown in FIG. 2.

Referring to FIG. 3, power source 150 (e.g., powered actuator, driver, etc.), shown as an electric motor 152, is a source of mechanical energy (e.g., rotational mechanical energy, etc.) that is derived from a stored energy source, such as a fuel cell, a battery, electricity, fuel, etc. According to one exemplary embodiment, motor 152 is powered by the battery and/or alternator of the vehicle in which the seat is provided. An electrical interface (e.g., cable, transmitter, etc.) (not shown) couples motor 152 to the battery and/or alternator of the vehicle. Motor 152 includes an output shaft 154 that is configured to be coupled to motion transfer apparatus 120 to transfer the rotational mechanical energy generated by motor 152 to track system 16.

With reference to the vertical lift system used to adjust the front of the seat, motor 152 has a generally cylindrical shape and is rigidly coupled between upper support frame structure 14 and upper track 24 of inboard track arrangement 18 in such a way that motor 152 is located generally adjacent track arrangement 18 and in such a way (as shown in FIG. 1) that the longitudinal axis of motor 152 is generally perpendicular to the longitudinal axis of lower track 22. Thus, motor 152 is located closer to track arrangement 18 than it is to track arrangement 20. Motor 152 is also coupled between upper support frame structure 14 and upper track 24 in such a way that motor 152 is located closer to the front of the seat, which helps to avoid placing motor 152 in a position that may interfere with space below the rear portion of the seat in which an occupant of a more rearward seat may place his or her feet.

The coupling of motor 152 between upper support frame structure 14 and upper track 24 may be facilitated by one or more of a variety of different support structures or devices, such as brackets, braces, straps, housings, fasteners, welding operations, etc. For example, as detailed below, motor 152 may be coupled between upper support frame structure 14 and upper track 24 via a bracket 132. According to various alternative embodiments, motor 152 may be coupled between upper support frame structure 14 and upper track 24 of outboard track arrangement 20, rather than inboard track arrangement 18, and may be located adjacent to track arrangement 20. According to further alternative embodiments, motor 152 may be coupled to a structure adjacent to upper support frame structure 14 and/or track system 16.

Referring further to FIGS. 2 and 3, motion transfer device or apparatus 120 (e.g., transmission unit, gear drive, gear system, gear arrangement, drive assembly, etc.) is an assembly of components that cooperate with motor 152 to control the movement of front torsion tube 26 (and thus the vertical movement of the seat). Motion transfer apparatus 120 is configured to transfer or convert the rotary motion provided by motor 152 into the movement of front torsion bar 26 (shown in FIG. 1). According to one exemplary embodiment, motion transfer apparatus 120 comprises a housing 122, a lead screw 136, a helical gear and drive nut 160, and a worm gear 170.

Housing 122 (e.g., body, case, etc.) is a generally rigid housing having a first portion 124 configured to be mounted to motor 152 and a second portion 126 configured to be mounted between upper support frame structure 14 and track system 16 (via a bracket 132 detailed below). First portion 124 defines a first cavity or chamber (not shown) configured to receive output shaft 154 of motor 152 and/or worm gear 170, while second portion defines a second cavity or chamber 128 (shown in FIG. 6) configured to receive lead screw 136, helical gear 160, and worm gear 170. The first chamber is in communication with second chamber 128 to allow worm gear 170 to engage helical gear 160. A cap or cover 130 is shown as being detachably coupled to a rear portion of second portion 126. Cover 130 is detachably coupled to housing 122 after the components of motion transfer apparatus 120 (e.g., helical gear 160, etc.) are inserted into second cavity 126 and secures the components therein. According to an exemplary embodiment, housing 122 and cover 130 are formed of a plastic material, but alternatively, one or both of housing 122 and cover 130 may be formed of any other known or otherwise suitable material.

Referring again to FIG. 1 in particular, housing 122 is configured to be fixedly coupled between upper support frame structure 14 and to track system 16. A bracket 132 is provided to facilitate the coupling of housing 122 between upper support frame structure 14 and track system 16, specifically upper track 24. Bracket 132 is shown as partially enclosing or concealing housing 122. According to an exemplary embodiment, bracket 132 is formed of a metal material. To facilitate the coupling of housing 122 to bracket 132, housing 122 and cover 130 are shown as comprising two through holes 134, each configured to receive a bolt (not shown). Bolts are inserted into holes 134 and subsequently engage bracket 132 to secure housing 122 thereto.

Referring further to FIGS. 2 and 3, lead screw 136 (e.g., screw, drive screw, threaded shaft or rod, worm, worm gear, power screw, etc.) is an elongated, threaded member extending between a first end 138 and a second end 140. First end 138 is configured to be fixedly coupled to torsion bar 26 (e.g., directly or via one or more linking members, etc.), while second end 140 is configured to move freely relative to housing 122. According to the exemplary embodiment illustrated, first end 138 is supported at a first side of housing 122 and comprises a relatively flattened portion defining an aperture 142 extending therethrough. Aperture 142 is configured to receive a fastener (not shown) for coupling lead screw 136 to a linking member that is in turn coupled to torsion tube 26 for coupling lead screw 136 for adjusting the seat position relative to track system 16.

First end 138 is further shown as comprising an annular or ring-shaped member (e.g., washer, bushing, etc.), shown as a collar 144, concentrically aligned with a longitudinal axis A-A of lead screw 136. Collar 144 functions as a stop for limiting the movement of lead screw 136 relative to housing 122 of motion transfer apparatus 120 in a first direction (e.g., rearward direction, etc.). Collar 144 may be a separate component coupled to lead screw 136 or alternatively may be integrally formed with lead screw 136 as a one-piece unitary member. Providing collar 144 as a separate component may allow the range of movement of lead screw 136 to be easily adjusted by simply moving collar 144 in the axial direction of lead screw 136 and subsequently securing collar thereto in the desired position.

Second end 140 of drive screw 136 is provided at a second side of housing 122 and comprises a second stop member (e.g., abutment, nut, etc.) shown as a second collar 146. Collar 146 functions as a stop for limiting the movement of lead screw 136 relative to housing 122 of motion transfer apparatus 120 in a second direction (e.g., forward direction, etc.). Like collar 144, collar 146 may be a separate component coupled to lead screw 136 or alternatively may be integrally formed with lead screw 136 as a one-piece, unitary member.

Lead screw 136 has a length that is suitable for allowing the seat bottom to be adjusted to the desired height. According to various alternative and exemplary embodiments, lead screw 136 may take one of a variety of different shapes, sizes, and configurations depending on the particular application in which it is used. For example, the cross-sectional shape of the threads of lead screw 136 may be square, trapezoidal, rounded, triangular, or one of a variety of other shapes. Moreover, the pitch and other characteristics of lead screw 136 may be adjusted to suit the particular application.

Helical gear 160 is a substantially annular or ring-shaped gear having a gear portion 162 and a shaft portion 164. Gear portion 162 defines an outside diameter of helical gear 160, while shaft portion 164 defines an inside diameter of helical gear 160 that is formed by an aperture 166 (e.g., bore, etc.) in the center of helical gear 160. Shaft portion 164 (e.g., hub, etc.) is a cylindrical member or sleeve that extends axially outward relative to each end of gear portion 162. The distance that shaft portion 164 extends in each direction may vary depending on various design criteria. According to the exemplary embodiment illustrated, shaft portion 164 extends axially outward in each direction a distance sufficient to support a friction reducing member on one side and a load transfer member on the other end (both of which are described in detail below). The inside diameter of shaft portion 164 is configured to receive lead screw 136 and includes a series of teeth or threads that are configured to engage the teeth or threads on lead screw 136. The teeth or threads of bore 166 on the inside diameter of shaft portion 164 and on lead screw 136 are configured such that when helical gear 160 is rotated around its axis (by worm gear 170), lead screw 136 translates (e.g., moves linearly) relative to helical gear 160 and housing 122. Gear portion 162 of helical gear 160 includes a series of teeth 168 extending radially outward from shaft portion 164. Gear teeth 168 are helical gear teeth configured to engage worm gear 170.

Worm gear 170 is relatively short, threaded shaft that is coupled to output shaft 154 of motor 152 and that engages helical gear 160. Worm gear 170 is arranged so that its axis of rotation is substantially perpendicular to the axis of rotation of helical gear 160. The end of worm gear 170 that engages helical gear 160 includes threads that are configured to engage the teeth around the outside diameter of helical gear 160. The engagement of worm gear 170 and helical gear 160 allows the axis of the rotational movement provided by output shaft 154 to worm gear 170 to be rotated 90 degrees. Thus, as output shaft 154 rotates worm gear 170, worm gear 170 rotates around a first axis, which in turn causes helical gear 160 to rotate (generally at a different rotational speed than worm gear 170) around a second axis that is perpendicular to the first axis and that helical gear 160 shares with lead screw 136. As helical gear 160 rotates around the second axis it shares with lead screw 136, helical gear 160 causes the translation movement of lead screw 136. The direction that helical gear 160 rotates (which is determined by the direction worm gear 170 rotates) determines whether the seat bottom is raised or lowered.

Motion transfer apparatus 120 is further shown as comprising a friction reducing member 180 and a load transfer member 200. Friction reducing member 180 is shown as being supported on a first side of helical gear 160, while load transfer member 200 is shown supported on a second side of helical gear 160. According to the exemplary embodiment illustrated, both friction reducing member 180 and load transfer member 200 are supported at least in part by shaft portion 164 of helical gear 160.

Friction reducing member 180 (e.g., balls, rollers, bushings, bearings, rolling elements, bearing surface, etc.), shown as a thrust bearing, is intended to provide and maintain the alignment between helical gear 160 and cover 130 and/or to reduce the friction between helical gear 160 and cover 130 during the rotational movement of helical gear 160. Friction reducing member 180 is positioned between the gear teeth of helical gear 160 and an inside wall of cover 130. Friction reducing member 180 is configured to at least partially absorb thrusts parallel to axis A-A of lead screw 136.

According to various alternative embodiments, the size of the friction reduction member may vary depending on the precise configuration and spacing of housing 122, helical gear 160, and/or cover 130. According to other various alternative embodiments, the number and location of the friction reduction members or bearings may vary. According to still other various alternative and exemplary embodiments, the friction reduction members may be one of a variety of different friction reduction members, including roller bearings, needle bearings, oval-shaped bearings, bushings, etc. According to still other alternative and exemplary embodiments, the friction reduction member may be fixed to, or captured within, cover 130 and/or housing 122.

Figure 4:
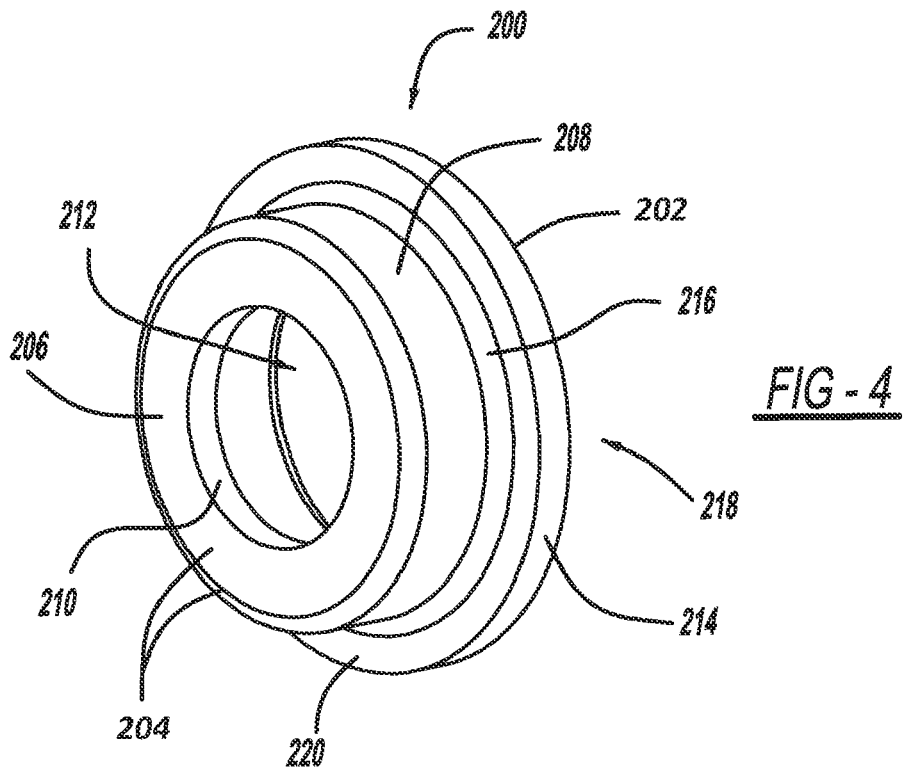
FIG. 4 is a perspective view of a load transfer member of the vertical lift system shown in FIG. 2.
Figure 5:
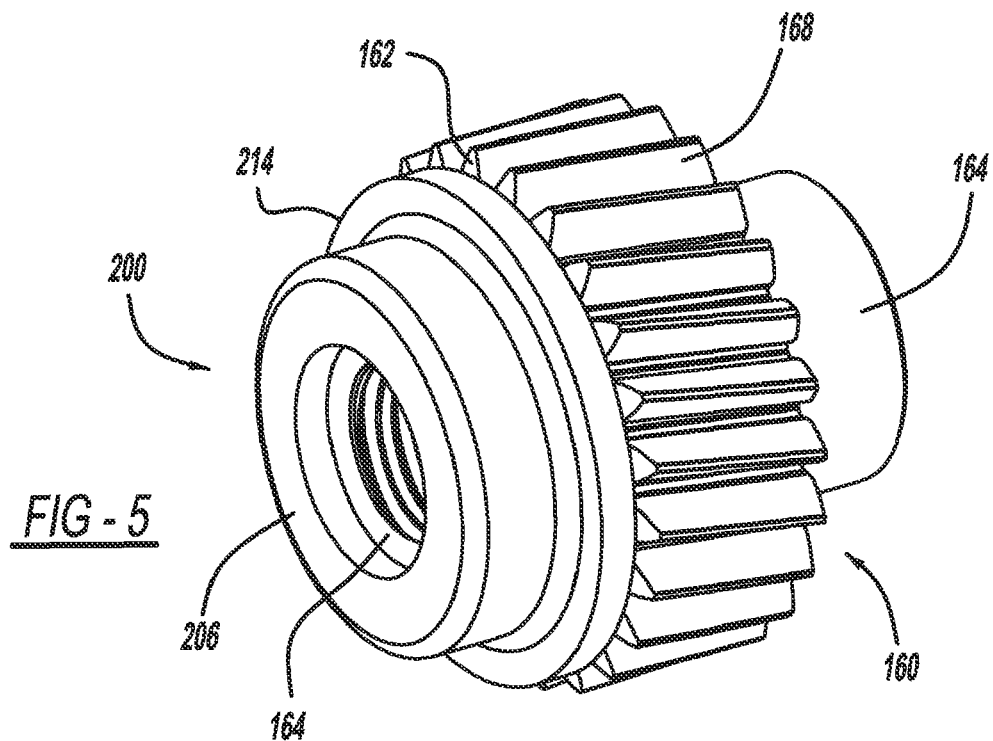
FIG. 5 is a perspective view of the load transfer member shown in FIG. 4 with a drive member of the vertical lift system shown in FIG. 2.
Figure 6:
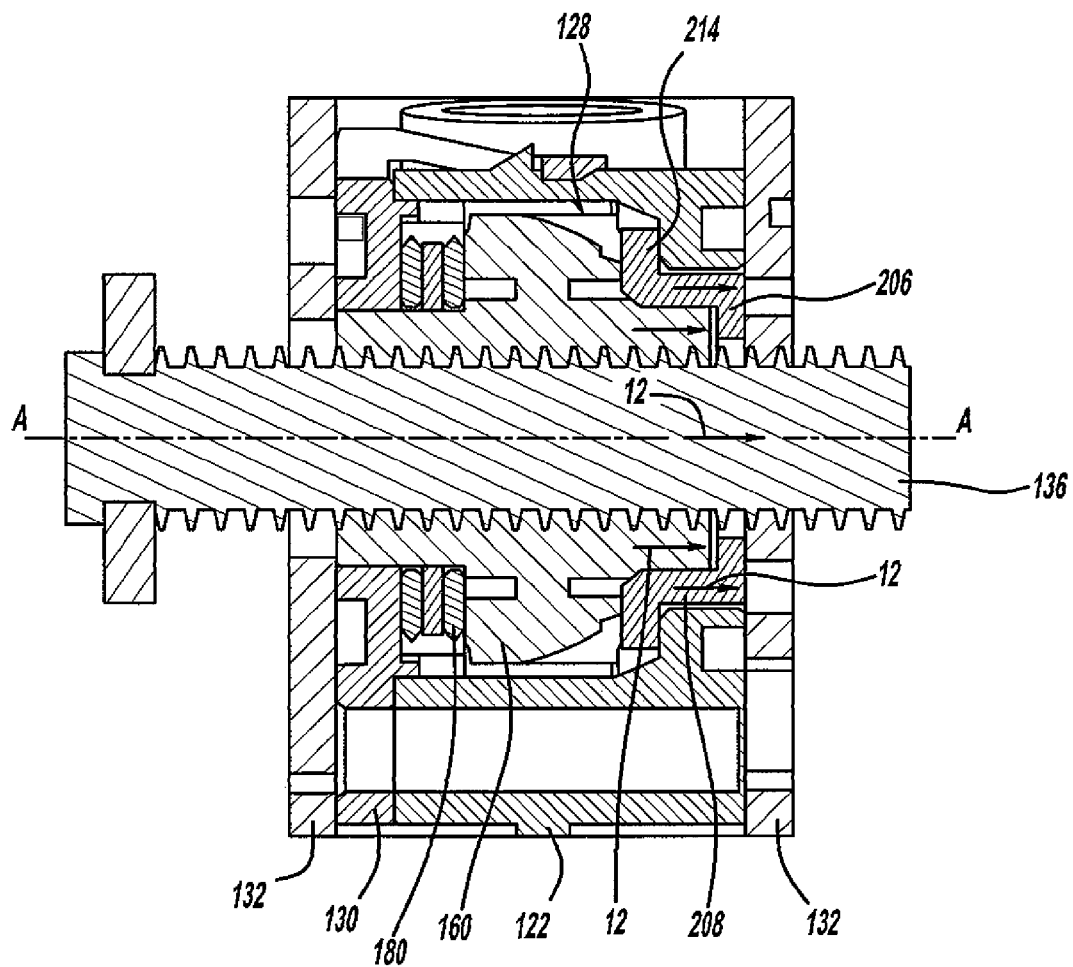
FIG. 6 is a partial cross-sectional view of the vertical lift system of FIG. 2 taken in the direction of the arrows along line 6-6.
Figure 7:
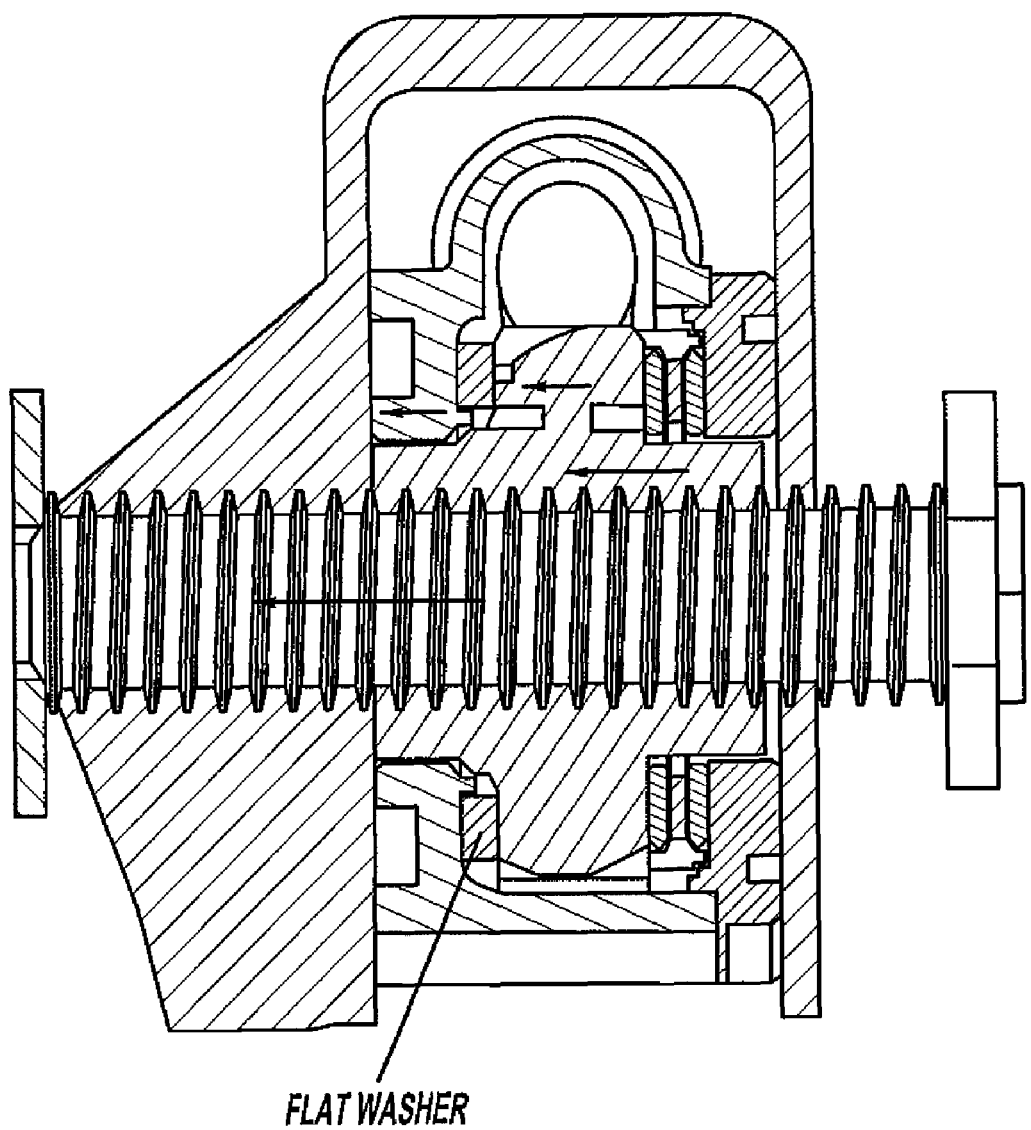
FIG. 7 is a cross-sectional view of a known vertical lift system shown under an axial load.

Referring to FIGS. 4 and 5, load transfer member 200 is shown according to an exemplary embodiment. Load transfer member 200 is positioned between helical gear 160 and bracket 132 and is configured to reduce the load placed upon helical gear 160 in an axial direction and/or to reduce the compression force placed upon housing 122 in the event of a vehicle impact. Load transfer member 200 has a first portion 204 configured to engage (e.g., directly engage, etc.) gear portion 162 of helical gear 160 and a second portion 202 configured to engage (e.g., directly engage, etc.) bracket 132 thereby providing a cushion between helical gear 160 and bracket 132. Load transfer member 200 may have any of a number of configurations depending on the configuration of helical gear 160, housing 122, and/or bracket 132.

According to the exemplary embodiment illustrated, load transfer member 200 is in the form of a cup washer having an end wall 206 (e.g., engagement portion, platform, face, etc.) and a side wall 208 extending downward therefrom at an orientation that is generally perpendicular to end wall section 206. End wall 206 is the portion of load transfer member 200 configured to engage bracket 132 and defines an aperture 210 configured to receive lead screw 136. Side wall 208 is generally cylindrical in shape and defines an aperture 212 (e.g., cavity, receptacle, bore etc.) which allows load transfer member 200 to be supported at shaft portion 164 of helical gear 160. The size and shape of the aperture 212 may vary depending on a number of design criteria (e.g., the configuration of shaft portion 164, etc.).

Load transfer member 200 further includes an extension (e.g., rim, projection, annular portion, etc.), shown as a flange 214, outwardly extending in a radial direction from side wall 208. Flange 214 includes a bottom surface 218, which is the portion of load transfer member 200 configured to engage gear portion 162 of helical gear 160. Flange 214 further includes a top surface 220 which is configured to engage a portion of housing 122. According to an exemplary embodiment, flange 214 is concentrically aligned with side wall 208 and has an outer surface with a diameter that is greater than the diameter of the outer surface of side wall 208. Preferably, a relatively smooth transition area 216 is formed between top surface 220 of flange 214 and side wall 208. According to the embodiment illustrated, flange 214 and side wall 208 are integrally formed as a single unitary body in a single mold by an injection molding operation to form load transfer member 200. According to various alternative embodiments, flange 214 may be coupled to side wall 208 in any suitable manner (e.g., welding, snap fit, etc.).

According to various alternative embodiments, the shape of load transfer member 200 may vary depending on the particular application. So long as load transfer member 200 has one portion configured to engage the helical gear and/or drive nut and a second portion configured to engage a support structure, the shape of load transfer member 200 may be any of a number of suitable shapes. For example, flange 214 may be provided at an angle relative to side wall 208 different than 90 degrees. According to other various alternative embodiments, side wall 208 may have one or more projections or indentations to assist in securing or aligning load transfer member 200 relative to helical gear 160. All such variations are included within the scope of the present inventions.

According to various alternative embodiments, motion transfer apparatus 120 may include one of a variety of different gearing arrangements that are effective to transfer the rotary motion provided by motor 152 into the translational motion of the lead screw 136. For example, rather than acting upon a helical gear, which then acts upon the lead screw, a series of spur or helical gears may be provided to spin a nut that acts upon the lead screw. According to other various alternative embodiments, motion transfer apparatus 120 may be configured such that one or more gears or nuts rotate around a stationary lead screw. According to still other various alternative embodiments, the system of gears or devices utilized within motion transfer apparatus 120 may have different gearing ratios.

According to one exemplary embodiment, the activation of power source 150 (e.g., motor 152) causes front torsion bar 26 to move, which in turn causes the front edge of the seat bottom to move up or down within the vehicle. More specifically, the activation of motor 152 causes output shaft 154 of motor 152 to rotate. Motion transfer apparatus 120, which is coupled to output shaft 154, converts the rotational movement of output shaft 154 into linear movement for moving lead screw 136, which is coupled to front torsion bar 26 (e.g., directly or via one or more link members, etc.). According to the embodiment illustrated, rotation of output shaft 154 causes worm gear 170 to rotate at the same speed as output shaft 154. The rotation of worm gear 170 causes helical gear 160 to rotate relative to lead screw 136. As helical gear 160 rotates relative to lead screw 136, the engagement of the threads or teeth of helical gear 160 with the threads of lead screw 136 causes lead screw 136 to move in a linear direction relative to helical gear 160 and housing 122. Because housing 122 is coupled between upper support frame structure 14 and lower track 22 and thus axially stationary) and lead screw 136 is coupled to torsion bar 26, the translational movement of lead screw 136 relative to helical gear 160 results in the movement of torsion bar 26. Depending on the gearing system utilized in motion transfer apparatus 120, the rotational speed of helical gear 160 may be reduced or increased relative to the rotational speed of output shaft 154, or it may be the same.

Rotation of helical gear 160 in one direction causes lead screw 136 to move linearly in a first direction, which in turn causes torsion tube 26 to move in a first direction, which in turn causes the pivotal movement of a linking member coupled to torsion tube 26 to move thereby resulting in a change of elevation of the front edge of the seat bottom (e.g., causes the front edge of the seat bottom to move upwards, etc.). Rotation of helical gear 160 in a second opposite direction causes lead screw 136 to move linearly in a second direction, which in turn causes torsion tube 26 to move in a second direction, which in turn causes the pivotal movement the linking member coupled torsion tube 26 to move thereby resulting in a change of elevation of the front edge of the seat bottom (e.g., causes the front edge of the seat bottom to move downwards, etc.).

In the event of an impact (e.g., collision, etc.), such as a rear impact, a load (shown schematically by arrows 12 in FIG. 6) is transferred from the vehicle seat occupant to the seat back. The load is in turn transferred from the seat back through track system 16 to torsion tube 26. From torsion tube 26, the load is transferred to drive screw 136 and subsequently to helical gear 160 in an axial direction. The load is then transferred to load transfer member 200 and finally to bracket 132. More specifically, when a load is imparted on helical gear 160 in an axial direction, gear portion 162 of helical gear 160 presses against bottom surface 218 of flange 214 of load transfer member 200. The load then passes through side wall 208 of load transfer member 200 to end wall section 206, which engages bracket 132.

Utilizing load transfer member 200 in the load path advantageously reduces the load imparted on helical gear 160 thereby reducing the likelihood that helical gear 160 will fail in the event of an impact. Load transfer member 200 reduces the load imparted on helical gear 160 by having a first portion in contact with helical gear 160 and a second portion in contact with bracket 132. Load transfer member 200 functions as a cushion between helical gear 160 and bracket 132 by absorbing much of the load that would otherwise be transferred to helical gear 160 (e.g., if a relatively flat washer was positioned between helical gear 160 and bracket). Load transfer member 200 also advantageously reduces compressive loading on the portion of housing 122 between helical gear 122 and bracket 132.

It should also be noted that the construction and arrangement of the elements of the seat adjuster as shown in the exemplary embodiment are illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided to the elements. It should also be noted that the elements and/or components of the system may be constructed from any of a wide variety of materials that provide sufficient strength or durability, in any of a wide variety of colors, textures and combinations. The order or sequence of any process or method steps may be varied or re-sequenced according to alternative embodiments. Accordingly, all such modifications are intended to be included within the scope of the appended claims. Other substitutions, modifications, changes and omissions may be made in the design, operating conditions and arrangement of the preferred and other exemplary embodiments without departing from the spirit of the appended claims.

What is claimed is:

1. A transmission device for a vehicle component adjuster that is supported by a support structure, the transmission device comprising:
   a housing having a first portion connected to a motor and a second portion connected directly to the support structure, wherein the first portion defines a first cavity, and wherein the second portion and the support structure define a second cavity;
   a drive screw having a first end fixedly coupled to a torsion bar that is displaced relative to linear movement of the drive screw and a second end that moves axially within the second cavity in the housing;
   a drive member threadedly engaging the drive screw, the drive member having a gear portion and a shaft portion that extends axially relative to an end surface of the gear portion, wherein the shaft portion includes a first end and a second end, and the shaft portion is configured to receive the drive screw; and
   a load transfer member having a side wall surrounding the shaft portion, the load transfer member having a first portion comprising a flange that extends radially outward from the side wall and is positioned between the end surface of the gear portion and at least one of the housing second portion and the support structure, and a second portion comprising a flange that extends radially inward from the side wall between the first end of the drive member shaft portion and at least one of the housing second portion and the support structure wherein a load initially applied to the torsion bar is transferred from the torsion bar to the drive screw and the drive member in an axial direction and through the load transfer member, to transfer the load to the support structure and reduce the load on the drive member,
   wherein the first portion of the load transfer member is configured to directly engage the gear portion of the drive member with the second portion of the load transfer member spaced from the first end of the drive member.

2. The transmission device of claim 1, wherein the periphery of the shaft portion is substantially perpendicular to the end surface of the gear portion.

3. The transmission device of claim 1, wherein the drive member gear portion includes a plurality of outwardly extending teeth in a radial direction in meshing engagement with a motor.

4. The transmission device of claim 1, wherein the load transfer member is a substantially annular cup washer.

5. The vehicle seat assembly of claim 1, wherein the shaft portion includes first threads on an inside diameter, and the drive screw includes second threads configured to engage the first threads.

6. A vehicle seat assembly comprising:
- a seat having a back portion and a seat base;
- a track arrangement supporting the seat base and back portion, wherein a torsion bar is connected to the track arrangement;
- a support structure coupled to the track arrangement;
- an adjuster having a housing the adjuster for moving the seat base relative to the track arrangement, and a first portion of the housing is connected directly to a motor and a second portion of the housing is connected to the support structure, wherein the first portion defines a first cavity and wherein the second, portion and the support structure define a second cavity;
- a drive screw having a first end fixedly coupled to a torsion bar that is displaced relative to linear movement of the drive screw and a second end that moves axially within the second cavity in the housing;
- a drive member threadedly engaging the drive screw, the drive member having a gear portion and a shaft portion that extends axially relative to an end surface of the gear portion, wherein the shaft portion includes a first end and a second end, and the shaft portion is configured to receive the drive screw, and
- a load transfer member having a side wall surrounding the shaft portion, the load transfer member having a first portion comprising a flange that extends radially outward from the side wall and is positioned between the end surface of the gear portion and at least one of the housing second portion and the support structure, and a second portion comprising a flange that extends radially inward from the side wall between the first end of the drive member shaft portion and and at least one of the housing second portion and the support structure, wherein a load initially applied to the torsion bar is transferred from the torsion bar to the drive screw and drive member in an axial direction and through the load transfer member, to transfer the load to the support structure and reduce the load on the drive member,
- wherein the first portion of the load transfer member is configured to directly engage the gear portion of the drive member with the second portion of the load transfer member spaced from the first end of the drive member.

7. The vehicle seat assembly of claim 6, wherein the adjuster provides for a vertical adjustment of the seat base.

8. The vehicle seat assembly of claim 6, wherein the drive member gear portion is in meshing engagement with an output of the motor.

9. The vehicle seat assembly of claim 6, wherein the load transfer member first portion is disposed at least partially around the drive member and the second portion separates the end surface of the drive member from the support structure.

10. The vehicle seat assembly of claim 6, wherein application of the load on the drive member initiates contact between a gear portion of the drive member and a bottom surface of the outwardly extending flange of the load transfer member, and the load is transferred through the load transfer member to an end wall section of the load transfer member and the load is dissipated through the support structure.

\* \* \* \* \*